US008708680B2

(12) United States Patent
Geltinger et al.

(10) Patent No.: US 8,708,680 B2
(45) Date of Patent: Apr. 29, 2014

(54) APPARATUS FOR SHAPING PLASTIC PREFORMS, COMPRISING A STERILE CHAMBER

(75) Inventors: Florian Geltinger, Donaustauf (DE); Josef Knott, Walkenstetten/Schierling (DE); Juergen Soellner, Beratzhausen (DE); Eduard Handschuh, Regensburg (DE); Frank Winzinger, Regensburg (DE); Josef Hausladen, Woerth/Donau (DE); Ulrich Lappe, Regensburg (DE); Klaus Voth, Obertraubling (DE); Oliver Martini, Konolfingen (CH)

(73) Assignee: Krones AG (DE)

( * ) Notice: Subject to any disclaimer, the term of this patent is extended or adjusted under 35 U.S.C. 154(b) by 257 days.

(21) Appl. No.: 13/112,913

(22) Filed: May 20, 2011

(65) Prior Publication Data

US 2011/0287126 A1 Nov. 24, 2011

(30) Foreign Application Priority Data

May 20, 2010 (DE) .......................... 10 2010 022 130

(51) Int. Cl.
*B29C 49/12* (2006.01)
*B29C 49/58* (2006.01)

(52) U.S. Cl.
USPC ................................ 425/3; 425/529; 425/535

(58) Field of Classification Search
USPC ............................................. 425/3, 529, 535
See application file for complete search history.

(56) References Cited

U.S. PATENT DOCUMENTS 4,552,527 A * 11/1985 Hunter ........................... 425/535
4,946,366 A * 8/1990 Dundas et al. ................ 425/536
6,143,234 A * 11/2000 Van Horn et al. ............. 264/528
6,214,282 B1 * 4/2001 Katou et al. ................... 264/524
7,900,422 B2 3/2011 Fischer ........................... 53/426
8,162,641 B2 * 4/2012 Sperka ............................. 425/3
2011/0241265 A1 10/2011 Schmidt ......................... 264/532
2012/0070340 A1 3/2012 Voth ................................ 422/28
2012/0070522 A1 3/2012 Voth et al. ........................ 425/88

FOREIGN PATENT DOCUMENTS

| DE | 19520925 | 12/1996 | ............. B65B 55/00 |
| DE | 102006053193 | 5/2008 | ............. B65B 55/04 |
| DE | 102008034241 | 1/2010 | ............. B29C 49/42 |
| DE | 102008038143 | 2/2010 | ............. B29C 49/42 |
| DE | 102009008632 | 8/2010 | ............. B29C 49/30 |
| EP | 0794903 | 3/2001 | ............. B65B 55/02 |
| EP | 2186619 | 5/2010 | ............. B29C 49/12 |
| EP | 2283991 | 2/2011 | ............. B29C 49/42 |
| EP | 2388129 | 11/2011 | ............. B29C 49/46 |
| EP | 2431058 | 3/2012 | ................ A61L 2/18 |
| WO | WO2010020529 | 2/2010 | ............. B29C 49/36 |
| WO | WO 2011030183 A1 * | 3/2011 | |

OTHER PUBLICATIONS

European Search Report issued for corresponding application No. 11166833.1, dated Jul. 5, 2012 (8 pgs).
German Search Report for DE102010022130.9 dated Apr. 14, 2011 (4 pages).

* cited by examiner

*Primary Examiner* — Robert B Davis
(74) *Attorney, Agent, or Firm* — Hayes Soloway P.C.

(57) ABSTRACT

An apparatus for shaping plastic preforms into plastic containers includes a transport device on which a plurality of blow molding stations are arranged. Each of these blow molding stations comprises a blow mold inside which a plastic preform can be shaped into a plastic container. The apparatus includes a clean chamber inside which the plastic preforms can be transported. The region of the transport device in which the blow molding stations are arranged is arranged in the clean chamber and at least one further region of the transport device is arranged outside the clean chamber.

22 Claims, 10 Drawing Sheets

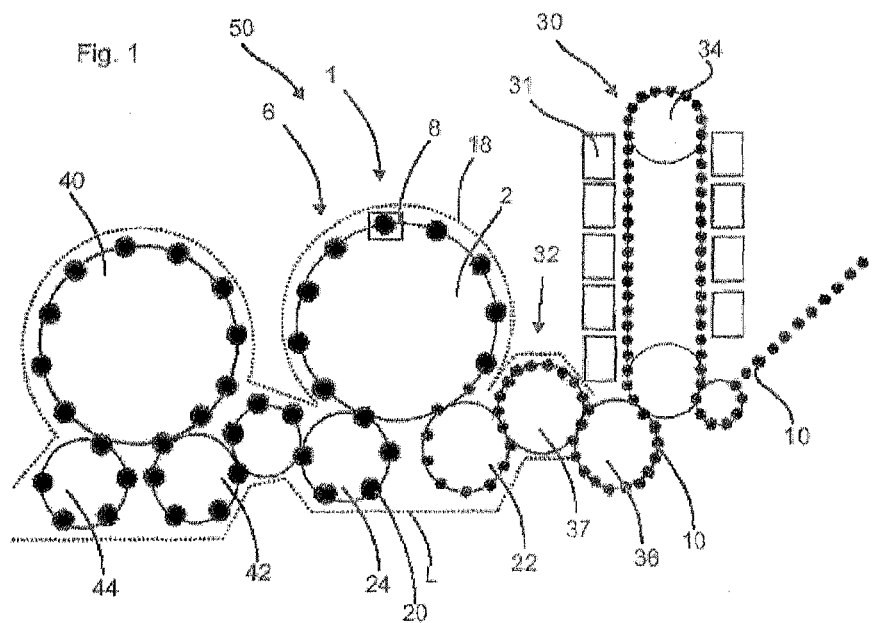
PRIOR ART
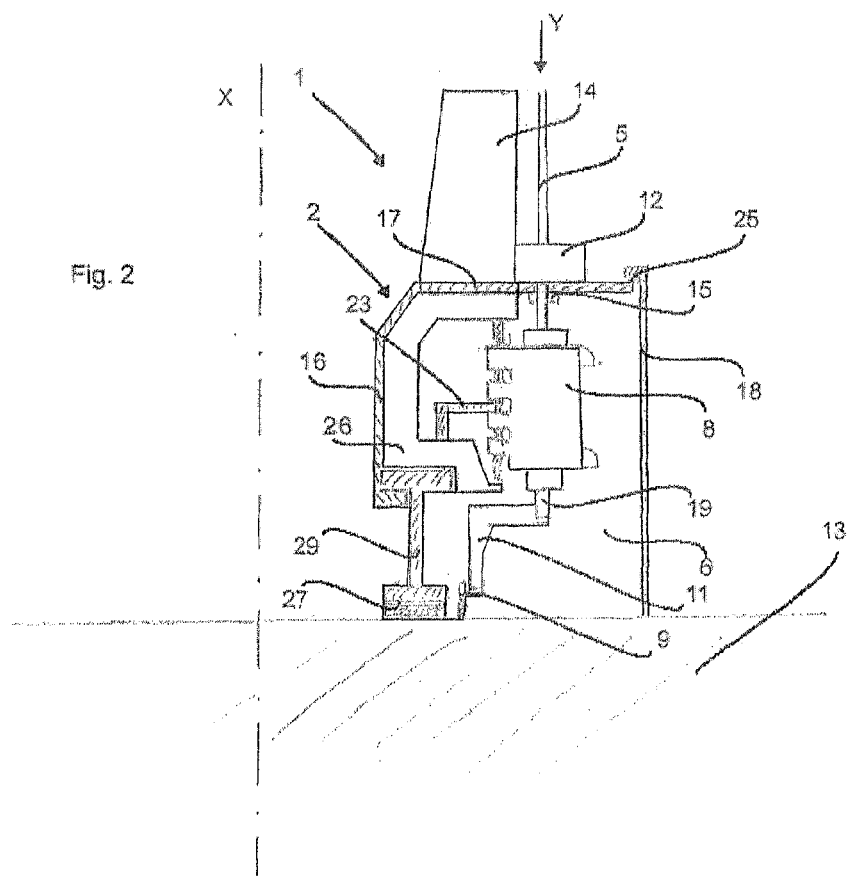
PRIOR ART

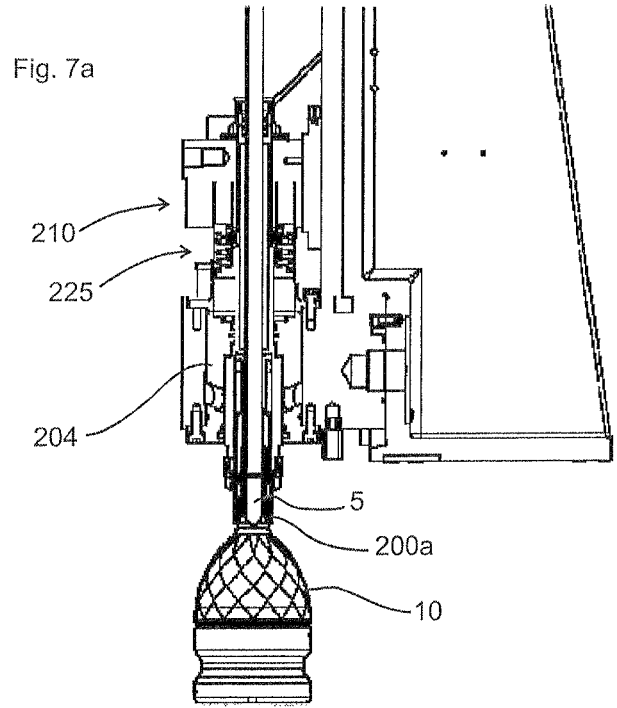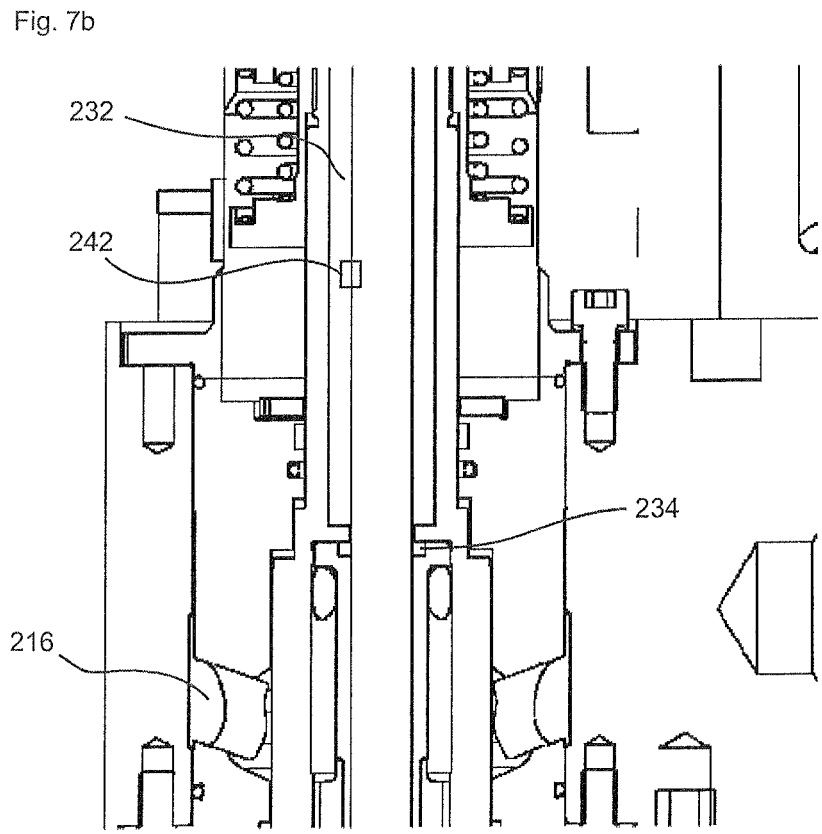

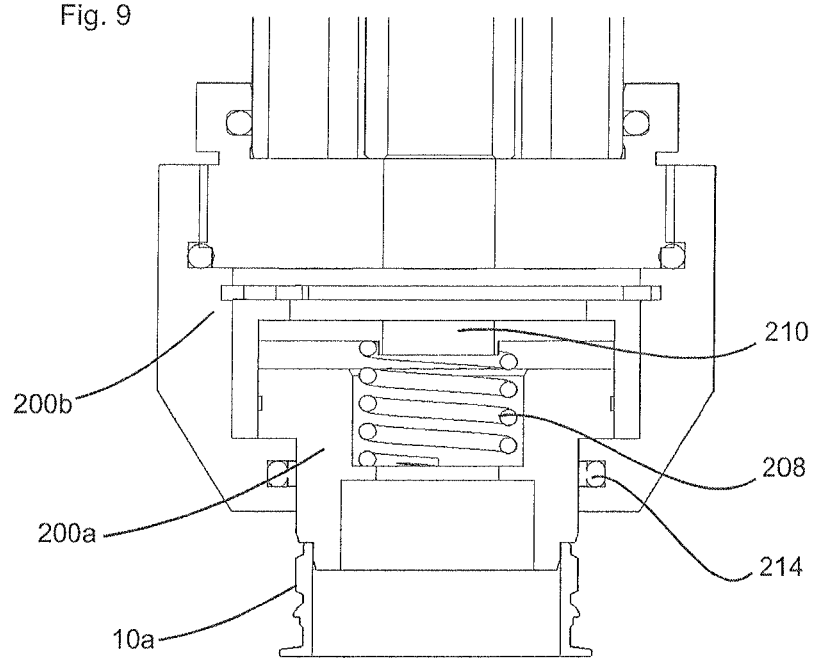
Fig. 9
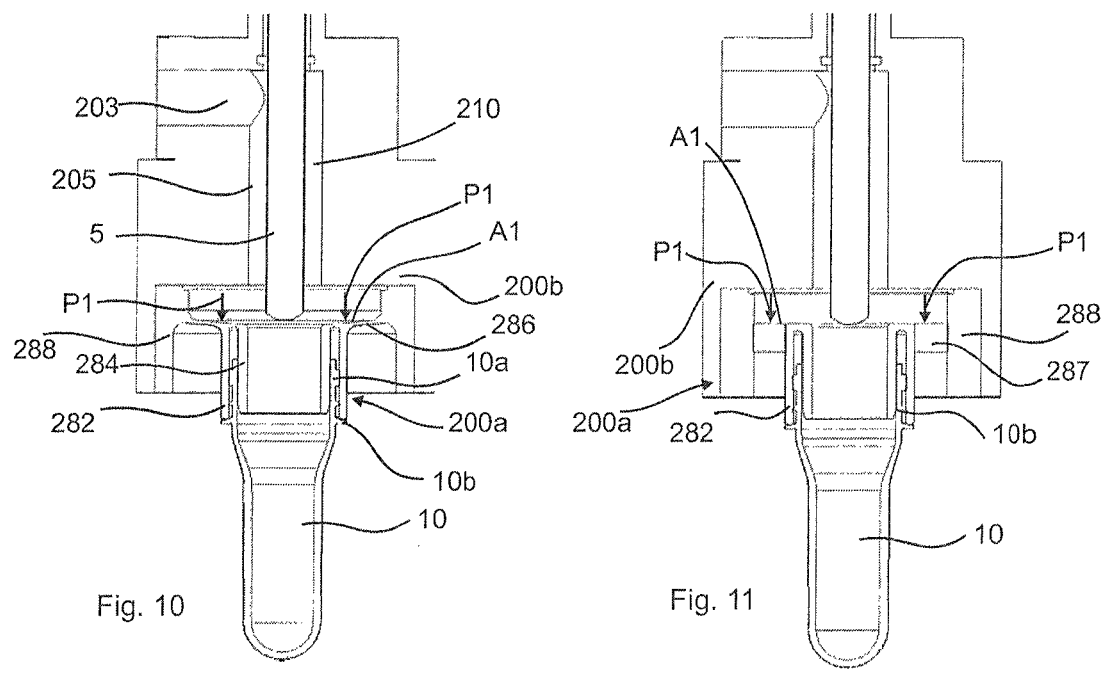
Fig. 10
Fig. 11

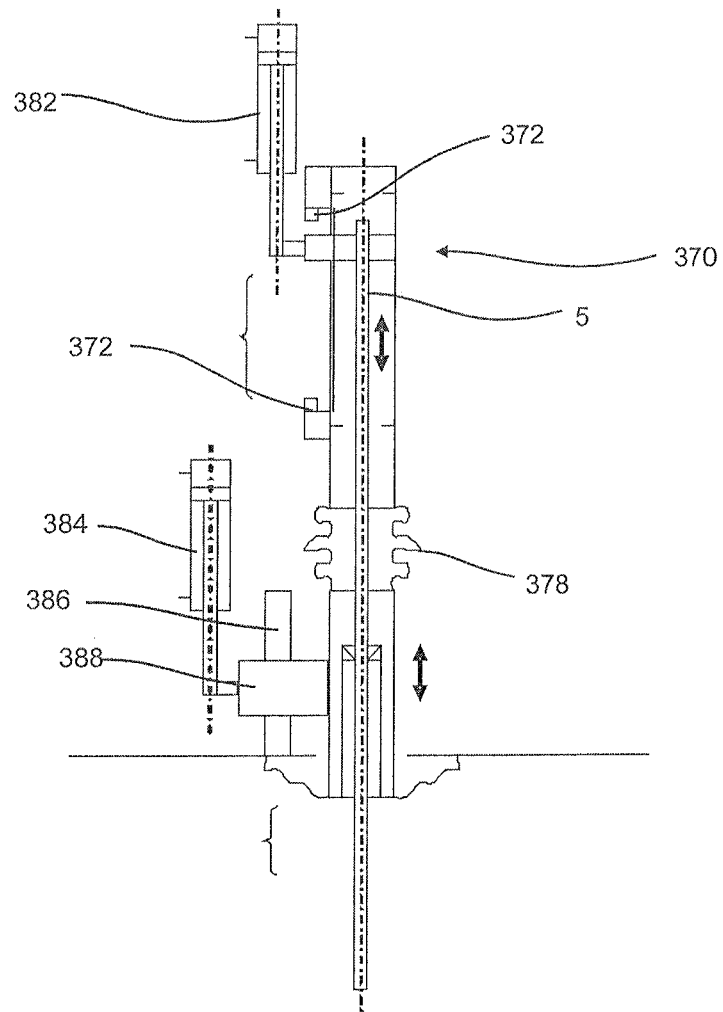
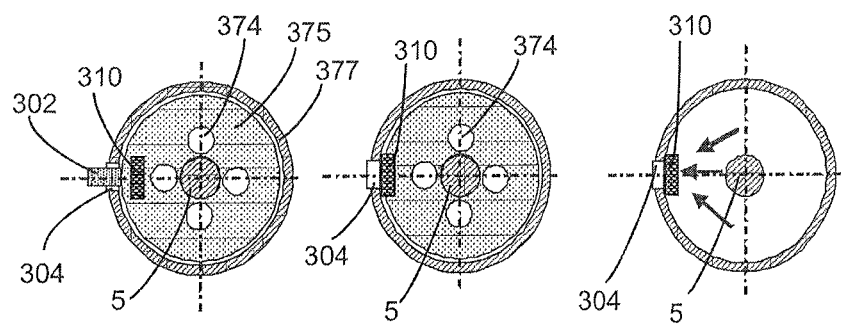
Fig. 16

APPARATUS FOR SHAPING PLASTIC PREFORMS, COMPRISING A STERILE CHAMBER

FIELD OF THE INVENTION

The present invention relates to an apparatus for shaping plastic containers. In the beverage-producing industry, it is known to use plastic containers, wherein these plastic containers are produced by a shaping process, and in particular a blow molding process, from plastic preforms. Usually, blow molding wheels are provided, on which a plurality of blow molding stations are arranged, wherein inside these blow molding stations the plastic preforms are expanded against an inner wall of the corresponding blow mold by the application of compressed air.

BACKGROUND OF THE INVENTION

For many beverages, it is necessary to carry out the filling operation under aseptic conditions. It is known that a sterilisation process for aseptic filling starts with the sterilisation of the already manufactured bottles in a clean chamber provided for this purpose. All the processes that take place beforehand in the prior art, such as the production of the preforms, the transport thereof, the heating thereof and the blow molding thereof to form the bottle, take place in a non-sterile environment. In this case, it is necessary to sterilise a relatively large surface area, namely the surface area of the plastic bottle that has already been produced.

Containers which are to be filled with sensitive filling product may be sterilised for example by heating the filling product and filling it in the hot state into the container and sterilising the inside of the bottle with the hot filling product. Furthermore, it is also possible that the empty container is sterilised separately prior to the filling process and is filled under aseptic conditions with the filling product that has been sterilised elsewhere. The sterility of the empty container is in this case achieved by using chemical disinfectants such as peracetic acid (wet) or hydrogen peroxide (dry). To this end, the containers are conveyed into a so-called isolator, in which disinfectant is applied thereto and must be left to act for a certain period of time and then must be removed again with great effort. With this procedure, there is a problem concerning residues. The aseptically encapsulated filling machine is arranged directly after this isolator. However, this technology is still relatively complicated.

It is therefore usually desirable to sterilise not the plastic bottle itself but rather the plastic preform, since this has a much smaller surface area. However, it is necessary to transport the containers after the sterilisation thereof, in particularly constantly, under sterile conditions, at least until they are closed, in order in this way to prevent further contamination of the containers.

EP 0 794 903 B1 describes a system and a method for the sterile packaging of beverages. In said document, a beverage container is formed from a shaped preform by blow molding, then the container is filled with a sterile beverage and finally the filled container is filled with a sterilised closure cap. In this case, different degrees of sterilisation are controlled in different parts of the chamber, wherein the degrees of sterilisation are correlated with the degree required for the method step carried out in the relevant part of the chamber.

In this production method, the entire bottle production process and also the filling and closing process is carried out constantly under sterile conditions. A complete shaping unit for the containers is also arranged in a clean chamber. This method ensures a high degree of sterilisation and cleanliness of the containers filled in this way. On the other hand, however, the complexity of the sterilisation is relatively high since on the one hand very large areas have to be kept sterile and on the other hand there is a large number of machine parts, specifically in the region of the blow molding device, which must be kept sterile.

The object of the present invention is therefore to reduce the complexity of sterilising and keeping sterile a shaping unit or blow molding device for containers. On the other hand, however, production conditions which are as sterile as possible should be provided for the containers.

An apparatus described in WO 2010 020 529 A2 for shaping plastic preforms into plastic containers comprises a transport device on which a plurality of blow molding stations are arranged, wherein each of these blow molding stations comprises a blow mold inside which a plastic preform can be shaped into a plastic container, and wherein the apparatus comprises a clean chamber inside which the containers can be transported. Furthermore, that region of the transport device in which the blow molding stations are arranged is arranged in the clean chamber and a further region of the transport device is arranged outside the clean chamber.

In this apparatus, therefore, a clean chamber channel is provided, through which the plastic preforms or containers are conveyed in the blow molding stations, and a further region of the transport device is moved outside the clean chamber. Parts of the shaping unit, such as a blow molding machine, e.g. the entire blow molding wheel or the blow molding cavities, are thus separated from the rest of the blow molding machine by a clean chamber or closed isolator.

The subject matter of WO 2010 020 529 A2 is hereby fully incorporated by way of reference into the subject matter of the present application. However, the applicant has found that, although satisfactory results can already be achieved with the aforementioned apparatus of WO 2010 020 529 A2, a further reduction in the volume of the clean chamber is nevertheless possible.

SUMMARY OF THE INVENTION

An apparatus according to the invention for shaping plastic preforms into plastic containers comprises a transport device on which a plurality of blow molding stations are arranged, wherein each of these blow molding stations comprises a blow mold, and the apparatus further comprises a clean chamber inside which the plastic preforms can be transported. Furthermore, each blow mold comprises an application device which is movable relative to the blow mold and which applies a gaseous medium to the plastic preforms inside the clean chamber. A drive device is also provided for moving the application device.

According to the invention, the drive device is arranged in an area outside the clean chamber and a sealing device is provided which seals off the clean chamber from an area in which the drive device is arranged.

It is therefore proposed to arrange parts of the blow mold arrangement or blow molding station outside the sterile chamber. In this way, the sterile chamber can be made smaller overall and thus only a small volume has to be kept sterile. Preferably, a region of the application device is arranged permanently inside the clean chamber, and with particular preference this is the region which makes contact with the mouths of the containers.

In one advantageous embodiment, the sealing device comprises an elastic sealing means. For example, a so-called bellows may be provided which seals off the clean chamber from its surrounding environment.

However, the sealing device may also comprise a gas barrier. This gas barrier is particularly suitable for sealing off lifting movements from one another. Instead of a gas barrier, a vapour barrier, a vapour condensate barrier or a barrier comprising other disinfectants would also be conceivable.

In a further advantageous embodiment, a stretching rod for stretching the plastic preforms is arranged on each blow molding station. In this case, the stretching rod is advantageously arranged at least partially inside the clean chamber and is sealed off from the area outside the clean chamber by sealing means. For instance, it would be possible that the entire stretching rod is arranged inside a sealing means, such as a bellows, and moves jointly with said bellows.

Advantageously, the stretching rod is sealed off from the application device by sealing means.

In a further advantageous embodiment, the apparatus comprises a valve block for controlling the supply of a gaseous medium to the application device, and the application device is preferably designed to be movable relative to said valve block. However, it would also be possible that the application device is moved jointly with said valve block.

Advantageously, each blow mold comprises two side parts and one bottom part, wherein the side parts and the bottom part together form a cavity inside which a plastic preform can be shaped into a plastic container. In this case, at least the regions of the side parts and of the bottom part which delimit the cavity are always arranged inside the clean chamber. Furthermore, at least one drive device is provided for moving the side parts and/or at least for moving the bottom part.

Advantageously, at least one of the drive devices or the drive device for moving the side parts or the bottom part is arranged at least partially outside the clean chamber, and a sealing device is provided which seals off the clean chamber from an area in which the drive device is arranged. It is therefore proposed to arrange outside the clean chamber at least one drive device which brings about or contributes to an opening or closing movement of the blow mold. In this way, the volume of the clean chamber can be further reduced in comparison to the prior art.

Preferably, one drive device is provided for moving the bottom part and a further drive device is provided for moving the side parts. However, it would also be possible that just one drive device is provided and a movement of the side parts is coupled to a movement of the bottom part via a coupling device. In this case, it is possible that this coupling device is arranged at least partially inside the clean chamber; however, it would also be possible that the coupling device is provided entirely outside or entirely inside the clean chamber.

Advantageously, at least one of the drive devices arranged outside the clean chamber is coupled to at least one side part or to the bottom part via a coupling device and this coupling device extends through a boundary of the clean chamber. Advantageously, the clean chamber is delimited by a wall, wherein this may be a flexible or a rigid wall. This wall advantageously also represents the boundary of the clean chamber relative to the non-sterile outside area. Here, a coupling device is to be understood to mean in particular a mechanical device which transmits a movement of the drive device to the bottom part or at least one side part.

Advantageously, the sealing device comprises an elastic sealing means. It would thus be possible that the coupling device is for example a rod or a rod assembly and a sealing means, such as a bellows for example, is arranged on this rod assembly. When using such a bellows, a sealed boundary of the clean chamber can be maintained despite a movement of the coupling device. Advantageously, at least a portion of the sealing means follows the coupling device in terms of its movement.

The drive device advantageously moves the bottom part or at least one side part along a finite path, i.e. along a movement path which has at least one end point and advantageously two end points (in contrast for example to a movement along a circular or elliptical path).

Advantageously, a first drive device is provided for moving the bottom part and a second drive device is provided for moving the side part and both drive devices are arranged outside the clean chamber.

In a further advantageous embodiment, the sealing device comprises a gas barrier. In this case a gas, such as steam for example, can be introduced into an area that is to be sealed off and said steam can form a gas barrier.

Furthermore, however, it would also be possible that sealing takes place by means such as so-called water locks for example. In this case, a movable element can be guided in a water container so that a lifting movement is possible without a gas thereby being able to cross a boundary between a sterile and a non-sterile chamber.

In a further advantageous embodiment, the apparatus comprises feed devices for feeding a temperature control fluid for the blow molds, and connections for the feed devices are arranged inside the sterile chamber or clean chamber. Furthermore, however, it would also be possible that a clean chamber boundary is provided in such a way that the feed devices for feeding the temperature control fluid and the connections for the feed devices are all arranged in the bottom part, always outside the clean chamber. Advantageously the bottom part and particularly preferably also the side parts are designed to be resistant to cooling water.

Advantageously, the apparatus comprises a sterilising device which is arranged upstream of the actual blow molding stations and which sterilises the individual plastic preforms.

Furthermore, it is proposed to revise a blow molding wheel of the blow molding machine, i.e. the region in which a plastic container is produced from the plastic preform. In this case, an area around the actual shaping region of the machine, i.e. the mold carrier with the blow mold, is encapsulated in such a way that this area can be sterilised. A sterile chamber is advantageously defined, and all media and components which cross the boundaries of this sterile chamber are configured in such a way that a chamber that has been sterilised once at the start of production also remains sterile. By virtue of the procedure according to the invention, it is also possible to prevent grease and ambient air from entering the sterile chamber.

In the region of the bottom part, it is necessary to carry out a lifting movement in order to be able to shape a blow-molded container. This lifting movement may be controlled by a cam which must also be greased in the prior art. It is therefore advantageous to arrange said cam outside the clean chamber. More specifically, it is possible that said cam runs below the mold carrier and therefore also below the clean chamber.

As an alternative, it is also possible to blow-mold the container in the upside-down position if said cam for the bottom part is located above the mold carrier and therefore also above the clean chamber.

However, other drive devices, such as for example servo motors, hydraulic or pneumatic lifting cylinders or the like, would also be conceivable as the drive device. Linear motors could also be used.

The abovementioned sterile chamber boundary between the clean chamber and the surrounding environment is advantageously designed in such a way that a drive device, for example the cam and cam roller, remains outside the sterile chamber. Advantageously, the clean chamber is delimited in the downward direction by an advantageously solid boundary with an opening.

As mentioned above, this opening serves at least for the passage of the bottom unit of the blow molding station and optionally also for the passage of the abovementioned feed and discharge devices of the temperature control media for the bottom mold or the bottom part.

In this case, a bellows may be provided between the bottom part and the opening, said bellows ensuring that the clean chamber is sealed off from the area of the guide cam.

It would also be possible to attach said bellows to the opening by a suitable clamping device, e.g. in the manner of a hose clip. In the event of changing the product or mold, it would be possible to configure this side in a detachable manner.

In this case it would be possible that said bellows projects into the interior of the clean chamber; however, it would also be possible that the bellows extends outwards relative to the clean chamber.

Advantageously, a wall which forms a boundary of the clean chamber moves with the individual blow molding stations.

Preferably, in a direction perpendicular to the transport direction (of the containers), some parts of the transport device are arranged inside the clean chamber and other parts are arranged outside the clean chamber.

The transport device is preferably a transport wheel which rotates about a predefined axis, wherein at least the axis or a shaft of the transport device is arranged outside the clean chamber. This means that the clean chamber is kept as small as possible and thus also the internal volume of the clean chamber can be kept small. Furthermore, this also means that the largest possible number of machine parts, which are not in direct contact with the blow molding stations, can be guided outside the clean chamber and in this way the level of contamination is also kept low.

Preferably, the clean chamber has an annular profile or a torus-like profile at least in some sections, but the cross-section of this torus-like profile preferably deviates from a circular shape here. This means that the blow molding stations are guided by the transport device on a substantially circular path.

In a further advantageous embodiment, a stretching rod for stretching the plastic preforms is arranged on each blow molding station and this stretching rod projects at least at times and partially out of the clean chamber. As is known, the stretching rod is used to stretch the plastic preforms during the production process. In principle, it would also be possible to guide the entire stretching rod always in the interior of the clean chamber. For this purpose, however, the clean chamber would have to be considerably enlarged in terms of its volume. In the preferred embodiment, therefore, it is proposed that the stretching rod projects outwards through an opening in the clean chamber. In order at the same time to prevent any contamination of this stretching rod, there is particularly preferably provided a bellows inside which the stretching rod runs, so that the stretching rod itself does not come into contact with the external environment. Sterile conditions thus also prevail inside the bellows.

In a further advantageous embodiment, the apparatus comprises a drive device arranged outside the clean chamber for moving the stretching rod and this drive device is advantageously coupled to the stretching rod via a magnetic coupling device. In other words, the movement of the stretching rod is produced by a drive device which is arranged outside the clean chamber, and at least one magnetic coupling device is provided which transmits the movements of the drive device to the stretching rod. In this way, it is possible to couple the movement of the stretching rod in a contactless manner to the movement of said drive device.

In a further advantageous embodiment, the stretching rod is arranged in a housing and is thus particularly preferably completely shielded or sealed off from the environment surrounding the clean chamber. For this embodiment, therefore, the stretching rod is advantageously arranged completely inside the clean chamber. In this way, there is no need for sealing devices which serve for sealing off the movements of the stretching rods.

For example, it is possible that the stretching rod is arranged in a tube which is connected to the clean chamber or isolator. Furthermore, it is possible that a magnet is arranged directly on the stretching rod and thus also inside the clean chamber, wherein this magnet advantageously at the same time performs a guide function for the stretching rod. The movement of this magnet can be produced via a rotor which is arranged outside the clean chamber, and said rotor can in turn be actuated via a drive. This drive may be for example a hydraulic cylinder, a pneumatic cylinder, a linear motor or the like.

In a further advantageous embodiment, the application device is pushed in the direction of the plastic preforms at least at times by the gaseous medium for application to the plastic preforms. It is known from the prior art that a blow molding nozzle provides sealing against a carrying ring or the threaded region of the plastic preform so that the process air for expanding the plastic preforms cannot escape from the containers in an uncontrolled manner. Such a blow molding nozzle is described for example in DE 10 2008 034 241 A1. The subject matter of said document is hereby fully incorporated by way of reference into the disclosure of the present application. It is pointed out that this embodiment is not limited to aseptic applications and in particular can also be used independently of the presence of a sterile chamber.

Due to the process technology, such a differential blow molding nozzle has a large number of gaps and is thus in particular not suitable for aseptic installations. In the embodiment described here, the process air is also used to press the application device and in particular the blow molding nozzle against the plastic preform for sealing purposes. In other words, process air is applied to a resulting surface of the application device, such as a blow molding piston for example. By virtue of a biasing of the blow molding nozzle, the blow molding nozzle provides sealing against the carrying ring or the thread of the plastic preform. This results in a pressure difference compared to the ambient air pressure. This means that the level of the pressing force against the carrying ring or thread is in a predefined ratio to the level of the process air pressure. In this way, the blow molding nozzle does not exert too great a force on the carrying ring during the blow molding process but nevertheless provides reliable sealing.

Advantageously, therefore, the blowing pressure is also used to push the blow molding nozzle in the direction of the plastic preform or the mouth thereof.

In a further advantageous embodiment, the application device comprises a blow molding piston and a blow molding nozzle arranged on this blow molding piston, and the blow molding piston is advantageously connected to the blow molding nozzle or a part of the blow molding nozzle in a stationary manner. The part of the blow molding nozzle that is connected in a stationary manner to the blow molding piston is advantageously connected to a further part of the blow molding nozzle via an elastic connecting element (which in particular is likewise part of the blow molding nozzle). It is therefore proposed that an elastic or flexible connection exists between a stationary and a movable part of the application device, which connection may with particular preference be formed for example by a plastic and in particular an elastomer, but on the other hand also by metal and particularly preferably spring steel. In comparison to the prior art, this results in much fewer gaps in which germs can survive.

Advantageously, therefore, the application device or the blow molding nozzle comprises a sealing region and a region at which it is connected in a stationary manner to the blow molding piston. This sealing region can advantageously carry out an axial relative movement in relation to the blow molding piston when pressure is applied. The connection between these two regions of the blow molding nozzle preferably takes place in a gap-free and elastic manner.

In a further advantageous embodiment, the blow molding nozzle has one or more surfaces which are particularly preferably made from plastic or metal.

In this way, the force acting on the plastic preform in the sealing region is dependent on the pressure level of the process air.

In a further advantageous embodiment, the blow molding nozzle is configured in multiple parts. In this way, installation and removal is facilitated and a quicker and less complicated change of fitting is possible.

In a further advantageous embodiment, the blow molding nozzle is configured in such a way that only very few gaps arise in the region of the process air.

Preferably, the clean chamber is delimited by a plurality of walls and at least one of these walls is arranged such as to be able to move and in particular rotate relative to another wall.

Preferably, a radially outer wall of the clean chamber is arranged in a stationary manner. A wall having an in particular cylindrical outer profile can thus be provided, which delimits the clean chamber. From inside this wall, a further wall is provided which delimits the clean chamber towards the other side and which is arranged in a rotatable manner. Preferably, this inner wall is rotated with the individual blow molding stations. Preferably, the aforementioned rotatable wall and the stationary wall are located opposite one another. The clean chamber is also delimited by a wall in the form of a cover, wherein this cover is preferably formed in one piece with the rotatable wall.

Preferably, a sealing device is arranged between at least two walls or one wall and a cover. This sealing device preferably seals off from one another parts that can move relative to one another. For example, it would be possible to provide between one wall and a cover a so-called water lock in which there is provided a water channel which is preferably of annular shape here and in which a portion of the part that can move relative to this water channel is guided.

In a further advantageous embodiment, the apparatus comprises a feed device for transferring the plastic preforms to the transport device, and this feed device is arranged inside the clean chamber. Here, therefore, the clean chamber preferably has a bulge or a deviation from the otherwise circular cross-section, and the feed device, such as for example a transport starwheel for the preforms, is accordingly arranged in this bulge. In this way, a gap-free transfer of the containers from the feed device to the transport device can take place inside a sterile chamber.

In a further advantageous embodiment, the apparatus also comprises a discharge device for picking up the formed plastic containers from the transport device, and this discharge device is likewise arranged inside the clean chamber. In this way, a clean chamber can be maintained even when transporting the containers away. It is thus possible that an introduction of preforms from upstream units into the isolator or clean chamber and also a discharging of the bottles to a subsequent unit is possible under clean chamber conditions. The isolator or clean chamber can be acted upon by cleaning and sterilising media.

In a further advantageous embodiment, a sterile gas is provided inside the clean chamber and this sterile gas is at a pressure greater than a pressure outside the clean chamber. By introducing sterilised air, the clean chamber can thus optionally be maintained at a higher pressure level than the surrounding environment, as a result of which it is possible to prevent any penetration of microorganisms. Furthermore, it is possible to supply an antimicrobial active ingredient continuously to the clean chamber and in this way to maintain a hygienic environment.

By virtue of a spatially delimited clean chamber in the blow molding apparatus, it is possible to transport previously sterilised preforms without recontamination both outside and inside during the stretch-blow molding process. Furthermore, the clean chamber is easier to keep at a low germ level than the shaping apparatus as a whole.

The present invention also relates to an installation for producing plastic containers, which comprises an apparatus for shaping plastic containers of the type described above and also a heating device, wherein this heating device is arranged upstream of the aforementioned apparatus in a transport direction of the plastic preforms. This heating device serves to heat the preforms so that they can then be expanded in a blow molding process to form containers. A filling device is advantageously provided downstream of or after the shaping apparatus and fills the containers with a beverage, in particular with an aseptic product. This filling device is also preferably arranged in a clean chamber. Furthermore, the clean chamber preferably extends into the region of a closing device which closes the containers with a cap.

Advantageously, the heating device comprises at least one microwave generating device.

Furthermore, the installation preferably comprises a sterilising device which sterilises at least one region of the plastic preforms prior to reaching the apparatus. This sterilisation may be carried out using a gaseous medium, such as in particular hydrogen peroxide. However, it would also be possible that the sterilisation takes place using radiation, such as for example electron beams and/or UV light. Preferably, a sterilising device is provided which sterilises in particular also the inner surface of the plastic preforms. In addition, however, the outer surface of the plastic preforms may also be sterilised.

In a further advantageous embodiment, the installation comprises a further clean chamber which is arranged in the transport device of the plastic preforms upstream of the abovementioned apparatus. Preferably, this further clean chamber merges into the clean chamber of the shaping device. In this way, it is possible to convey the plastic containers continuously from the sterilisation thereof to the closing thereof, and at the same time to keep the necessary clean chambers relatively small. The clean chamber is thus preferably provided as a channel which extends from the sterilising device to the closing device and which with particular preference is adapted in each case to the relevant blow molding stations or holding devices such as gripping elements for the preforms or plastic containers.

The present invention also relates to a method for shaping plastic preforms into plastic containers, wherein the plastic preforms are transported by means of a transport device, on which a plurality of blow molding stations are arranged, and are shaped into plastic containers during this transport. In this case preferably the entire blow molding stations, or at least parts thereof, are transported through a clean chamber.

The blow molding stations in each case comprise a blow mold and an application device which is movable relative to the blow mold and which applies a gaseous medium to the plastic preforms inside the clean chamber. According to the invention, a drive device moves the application device and this drive device is arranged in an area outside the clean chamber, and also provided is a sealing device which seals off the clean chamber from an area in which the drive device is arranged.

Preferably, at least one region of the transport device is also moved outside the clean chamber. In a further preferred method, the blow molding stations are moved on a circular path and with particular preference are moved always inside the clean chamber.

BRIEF DESCRIPTION OF THE DRAWINGS

Further advantages and embodiments will become apparent from the appended drawings:

In the drawings:

FIG. 1 shows a schematic diagram of an installation for producing plastic containers according to the prior art;

FIG. 2 shows a view of a clean chamber in the region of a blow molding station according to the prior art;

FIGS. 7a-7b show two diagrams to illustrate a gas barrier;

FIG. 9 shows an embodiment of an application device;

FIG. 10 shows a configuration of an application device in a preferred embodiment;

FIG. 11 shows an embodiment of an application device in a preferred embodiment;

DETAILED DESCRIPTION OF THE INVENTION

Figure 3:
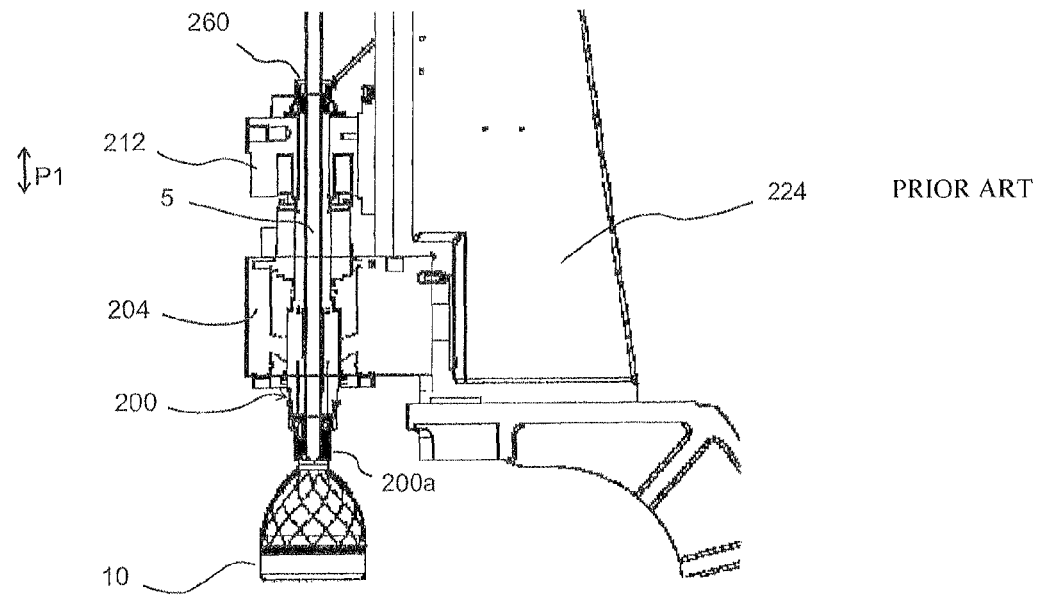
FIG. 3 shows a schematic diagram of an apparatus according to the prior art.

FIG. 1 shows a schematic diagram of an installation according to the prior art for producing plastic containers. This installation 50 comprises a heating device 30, in which plastic preforms 10 are heated. These plastic preforms 10 are guided through this heating device 30 by means of a transport device 34, such as a revolving chain in this case, and in the process are heated by a plurality of heating elements 31. This heating device 30 is adjoined by a transfer unit 36 which transfers the preforms 10 to a sterilising device 32. Here, this sterilising device 32 also comprises a transport wheel 37 and sterilising elements may be arranged on this transport wheel 37 or else in a stationary manner. In this region, for example, a sterilisation by hydrogen peroxide gas or, as mentioned above, by electromagnetic radiation is possible. In particular, an internal sterilisation of the preforms is carried out in this region.

Reference 6 denotes in its entirety a clean chamber, the outer boundaries of which are marked here by the dotted line L. It can be seen that this clean chamber 6 starts in the region of the sterilising unit 32. In this region, lock devices may be provided for introducing the plastic preforms into the clean chamber 6 without too much gas inside the clean chamber being lost.

As indicated by the dashed line L, the clean chamber is matched to the external shape of the individual components of the installation. In this way, the volume of the clean chamber can be reduced.

Reference 1 denotes in its entirety a shaping apparatus, in which a plurality of blow molding stations 8 are arranged on a transport wheel 2, wherein just one of these blow molding stations 8 is shown here. By virtue of these blow molding stations 8, the plastic preforms 10 are expanded to form containers 20. Although not shown in detail here, it is not the entire area of the transport device 2 that is located inside the clean chamber 6, but rather the clean chamber 6 or isolator is to a certain extent embodied as a mini-isolator inside the apparatus as a whole. For instance, it would be possible that the clean chamber is configured in the manner of a channel at least in the region of the shaping apparatus 1.

Reference 22 denotes a feed device which transfers the preforms to the shaping apparatus 1, and reference 24 denotes a discharge device which conveys the produced plastic containers 20 away from the shaping apparatus 1. It can be seen that, in the region of the feed device 22 and the discharge device 24, the clean chamber 6 has respective recesses which accommodate these devices 22, 24. In this way, a transfer of the plastic preforms 10 to the shaping apparatus 1 and a removal of the plastic containers 20 from the shaping apparatus 1 can be achieved in a particularly advantageous manner.

By means of a transfer unit 42, the expanded plastic containers are transferred to a filling device 40 and are then conveyed away from this filling device 40 by a further transport unit 44. Here, the filling device 40 is also located inside said clean chamber 6. In the case of the filling device, too, it would be possible that it is not the entire filling device 40 including for example a reservoir for a beverage that is arranged completely inside the clean chamber 6, but rather here too only those regions in which the containers are actually guided. The filling device could thus also be constructed in a manner similar to the apparatus 1 for shaping plastic preforms 10.

As mentioned, the clean chamber 6 in the region of the apparatus 1 is reduced to an area that is as small as possible, namely substantially to the blow molding stations 8 themselves. Due to this small design of the clean chamber 6, it is possible to establish a clean chamber with greater ease and speed and it is also less difficult to keep it sterile in the operating phase. Moreover, less sterile air is required, which leads to smaller filter systems and also the risk of uncontrolled vortex formation is reduced.

FIG. 2 shows a detailed diagram of the apparatus 1 in the region of a blow molding station 8. A plurality of such blow molding stations 8 are moved in rotation about an axis X by a transport device 2. As can be seen in FIG. 2, the blow molding station 8 is guided inside the clean chamber 6, which is designed here in the shape of a channel. This clean chamber 6 is closed off by a movable side wall 16 and a cover 17 formed in one piece with this side wall 16. This side wall 16 and the cover 17 rotate with the blow molding station 8.

Reference 18 denotes a further wall which delimits the clean chamber 16. Here, this wall 18 is an outer wall which is arranged in a stationary manner. Provided between the cover 17 and the wall 18 is a sealing device 25 which seals off from one another the elements 17 and 18 which can move relative to one another, for example, as mentioned above, using a water lock. The lower region of the wall 18 is arranged in a secure and sealing manner on a bottom 13. Provided inside the clean chamber 6 and in a manner directly bearing against the wall 16 is a carrier 26 which likewise moves in rotation and on which there is in turn provided a holding device 23 which holds the blow molding station 8.

Reference 11 denotes a follower device which can be actuated by a guide cam 9 so as to open and close the blow molding station as it travels through the clean chamber 6 in order in particular to place the plastic preform into the blow molding station and also remove it again therefrom. Here, a guide cam 9 is also arranged inside the clean chamber 6. However, it would also be possible for example to move a section 19 below the individual blow molding stations 8 out of the clean chamber 6.

The transport device 2 may also comprise further elements which are arranged above the clean chamber 6.

The carrier 26 is arranged fixedly on a holding body 29 and this holding body is in turn movable relative to the bottom 13. Here, reference 27 denotes a further sealing device which also seals off in this area the regions 13 and 29 which are movable relative to one another.

Reference 5 denotes a stretching rod which is movable relative to the blow molding station in order to stretch the plastic preforms 10 in their longitudinal direction. Here, a carriage 12 is arranged on the cover 17, and the stretching rod is movable in the direction Y relative to said carriage. Reference 14 denotes a further mount for this carriage 12 of the stretching rod 5.

It can be seen that certain regions of the stretching rod are both outside the clean chamber 6 and inside the clean chamber during the blow molding process. For this purpose, it is possible to provide a protective device such as a bellows outside the clean chamber 6 and above the carriage 12, which protective device surrounds the stretching rod 5 so that no region of the stretching rod 5 comes into direct contact with the external environment.

The abovementioned heating device for heating the plastic preforms is preferably likewise of aseptic design. This means that, already in the region of the heating device 30, contrary to what is shown in FIG. 1, the plastic preforms can be guided through a clean chamber and this clean chamber extends for example continuously over the blow molding machine to the filling device. In this case it is possible that the entire heating device 30 is arranged inside a sterile chamber, but it would also be possible that, here too, in particular the region in which the plastic preforms are transported is encapsulated as a sterile chamber with respect to the surrounding environment. For example, it would be possible that the plastic preforms are transported by means of mandrels which engage in the mouth thereof, and the mandrels in this case project through a wall into a clean chamber. A positive pressure could also be applied to this clean chamber so that no ambient air can enter this clean chamber.

The heating device could in this case be configured as an infrared heating device, as shown in FIG. 1. Advantageously, however, a microwave heating device is used as the heating device here. Such microwave heating devices for heating plastic preforms are known per se from the prior art. In this case, a plurality of microwave heating stations could be arranged for example on a carrier wheel. The plastic preforms could be fed to these individual heating stations via locks. Due to the design with individual heating stations, a microwave-based heating device is particularly suitable for combining with sterile chambers.

FIG. 3 shows a partial diagram of an apparatus according to the prior art. Here, an application device is provided which is denoted as a whole by 200 and which comprises a blow molding nozzle 200*a* that is placed during the expansion process onto a mouth of a container 10 in order to expand the latter. Reference 204 denotes a valve block in which the individual gas supplies necessary for expanding the container are controlled. As mentioned above, a stretching rod 5 serves for stretching the plastic preform.

Reference 212 denotes a carriage which is arranged such as to be movable in the direction P1. By means of this carriage, the application device 200 is likewise moved in the direction of the double-headed arrow P1 and is placed for example onto the mouth or a carrying ring of the container 10. However, it would also be conceivable to place the application device or blow molding nozzle onto the blow mold and to seal it off relative to the blow mold. The drive device used is a guide roller (not shown in FIG. 3) which runs over a guide cam (not shown). Reference 260 denotes a sealing device, by means of which the stretching rod 212 is sealed off from the carriage. The carriage 212 is in turn arranged in a displaceable manner on a carrier 224.

In the diagram shown in FIG. 3, the sealing device 260 of the stretching rod 5 is a seal, such as for example a shaft sealing ring, a Glyd ring, a quart ring or the like. However, these seals are not subject to strict hygiene requirements. More specifically, when the stretching rod dips into the container, germs from outside may enter the container 10. In contrast thereto, in the case of an aseptic design of the apparatus, it must be ensured that no harmful germs are transported by the stretching rod 5 into the bottle to be produced.

Figure 4A:
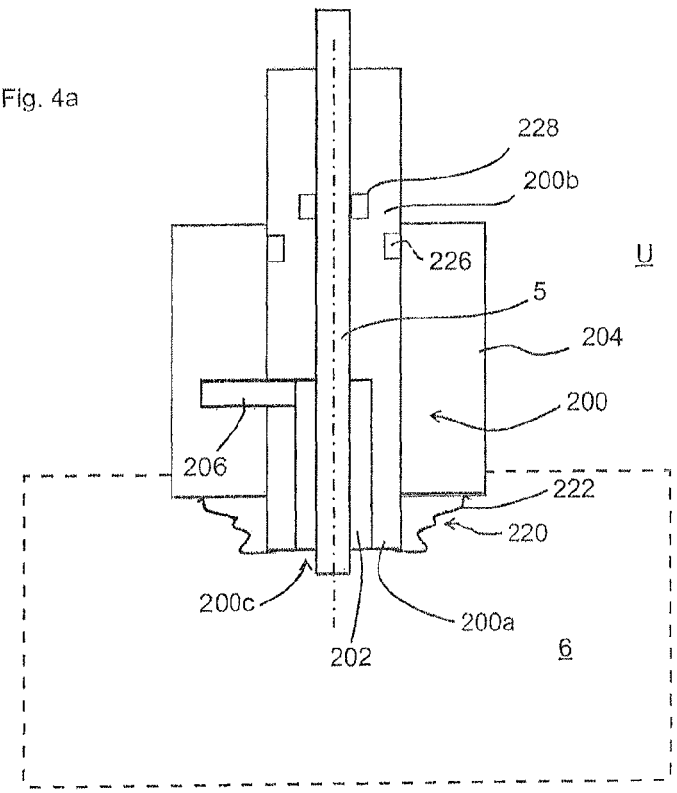
FIGS. 4a-4b show two highly schematic diagrams of an arrangement according to the invention.

FIG. 4*a* shows a highly schematic diagram of an arrangement according to the invention. Here too, an application device is provided which is denoted as a whole by 200 and which is configured here in one piece and comprises in its lower region a blow molding nozzle 200*a* and in its upper region a so-called blow molding piston 200*b*. In any case, the region of the blow molding nozzle 200*a* projects at least at times into a sterile chamber 6 of the apparatus. Reference 204 also denotes here once again a valve block, wherein in this case for example compressed air can be fed to the container (not shown) via a feed 206. Here, the application device 200 in its entirety is movable relative to the valve block 204, which is arranged in a stationary manner here. However, it would also be conceivable that the valve block is also moved. By means of a sealing device 226, which may be configured here for example as a ring seal, the application device 200 is sealed off from the valve block 204.

The blow molding piston or parts of the blow molding piston 200*b* are located at times inside the clean chamber 6 (in particular while the gaseous medium is being applied to the containers) and at times outside the clean chamber 6 (for example while the plastic preforms are being introduced into the blow mold and the blow-molded containers are being removed from the blow mold).

The stretching rod 5 is also arranged in a movable manner here, more specifically movable relative to the application device 200. Reference 228 denotes a second sealing device, by means of which the stretching rod 5 is sealed off from the application device 200. Reference 222 denotes here a sealing device such as a bellows, which in this embodiment at the same time also represents the clean chamber boundary. This means that the sterile chamber ends above this bellows 222. However, it would also be conceivable that the sterile chamber also continues above the bellows 222, or that a gas seal which will be described in more detail below is provided instead of the bellows.

In the embodiment shown in FIG. 4a, therefore, the underside 200c of the application device, which is ultimately placed against the container, is arranged inside the sterile chamber. The chamber 202 formed inside the application device 200 for supplying a gas is also part of the clean chamber 6 here.

Therefore, in the embodiment shown in FIG. 4a, the blow molding nozzle 200a dips into an isolator or clean chamber 6 and is shielded from the surrounding environment U by the bellows 222. A further sealing device 228, which may likewise be configured as an O-ring, seals off the stretching rod 5 from the application device 200.

Figure 4B:
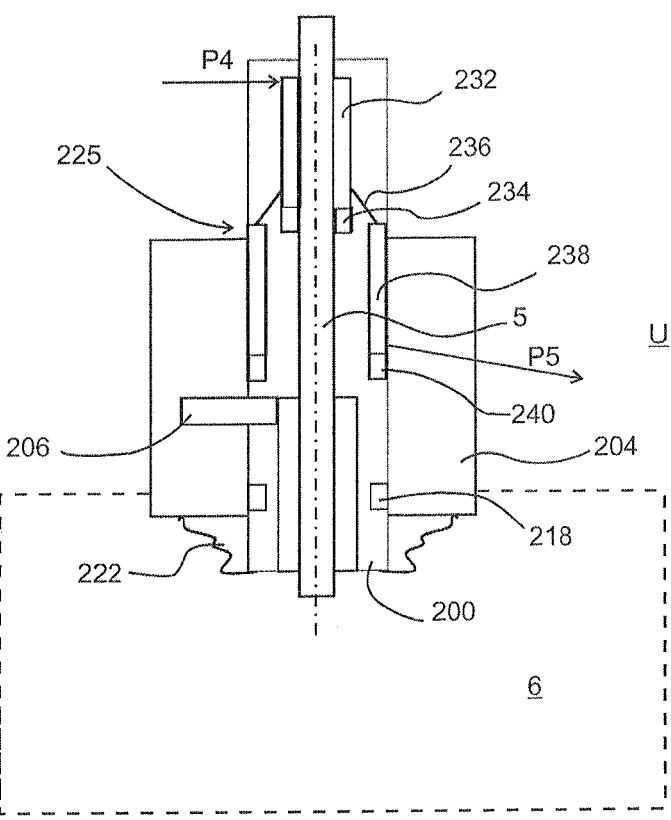

In the embodiment shown in FIG. 4b, the blow molding nozzle 200a likewise dips into the sterile chamber 6 but in this case is shielded from the surrounding environment by a gas barrier denoted in its entirety by 225. A barrier medium, such as vapour condensate or a liquid, is fed to this gas barrier in the direction of the arrow P4. This barrier medium passes firstly into a receiving chamber 232 which surrounds the stretching rod 5. Reference 234 denotes a sealing device which seals off this receiving chamber 232 from the stretching rod 5. The chamber 232 thus seals off the stretching rod 5 from the application device 200 or the blow molding piston 200b.

Via connecting lines 236, the barrier medium is then guided into a second chamber 238 which surrounds the application device 200 in the circumferential direction. This chamber 238 is sealed off at the bottom by sealing devices 240. This second sealing chamber 238 serves to seal off the application device 200 from the outside, i.e. from the valve block 204. The barrier medium can then exit again from the second chamber 238 in the direction of the arrow P5. However, it would also be possible to supply the two receiving chambers separately with a barrier medium and also to convey the latter away separately.

Preferably, therefore, the application device 200 is sealed off by two sealing devices which are both arranged below the drive device 210.

Reference 218 denotes further sealing devices for sealing off the application device 200 from the valve block 204. This sealing device may once again be configured as an O-ring.

The barrier medium is preferably a gas, but here vapour or a vapour condensate is also understood to be a gas. In addition, however, a liquid barrier may also be provided.

In addition, the sealing device 234 may also serve to seal off, upstream of the sealing device 234 or the barrier, the pressure of the sterile chamber 6 from the surrounding environment U.

Advantageously this sealing device 234 and particularly preferably also the sealing devices 240, 226, 220 and 218 are designed to be temperature-resistant. The sealing device 240 is advantageously located between the sterile chamber 6 and the surrounding environment or upstream of the sealing device 234.

The stretching rod 5 likewise dips into the clean chamber 6 and is shielded from the surrounding environment by the upper part of the sealing device 225, i.e. in particular the first chamber 232. Here too, the sealing device may be a vapour barrier, a vapour condensate or a liquid barrier. Once again, the pressure of the sterile chamber can be sealed off from the surrounding environment by means of the sealing device 234, which in this case is inserted upstream of the chamber 232.

It would also be possible to clean and also to sterilise the sterile chamber 6 via the application device or valves (not shown) of the pressure application device.

Figure 5:
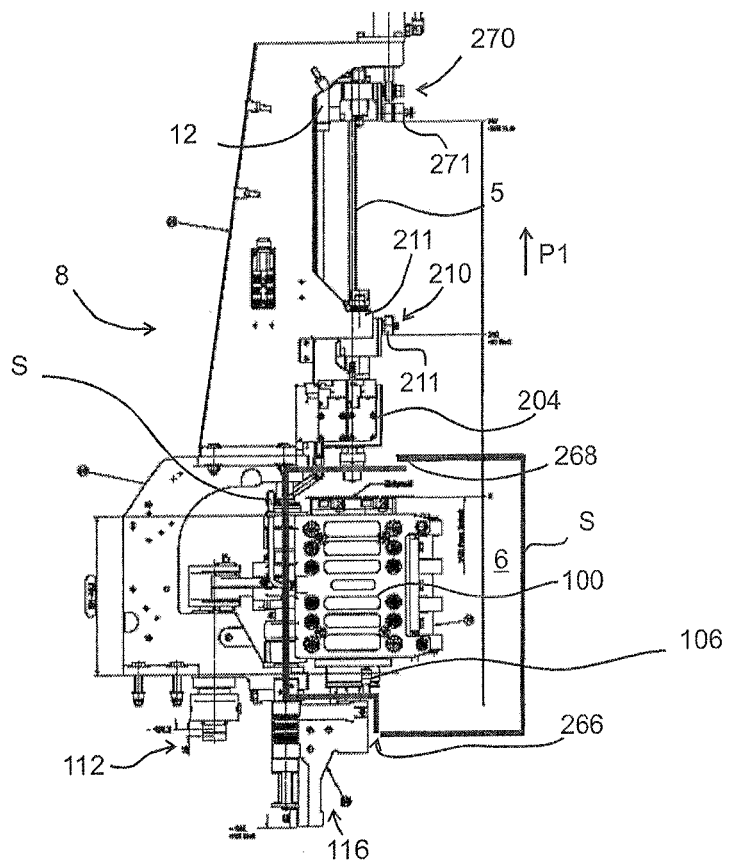
FIG. 5 shows a side view of a blow molding station according to the invention.

FIG. 5 shows a further diagram of an apparatus according to the invention. More specifically, there is shown here a blow molding station 8 which comprises a blow mold or a blow mold carrier 100, inside which the plastic preforms are expanded to form plastic containers. Here, the bold line S denotes the sterile chamber boundary. It can be seen that the sterile chamber is designed to be relatively tight around the individual blow molds.

A drive device 112 brings about the opening and closing of the two blow mold halves or of the side parts of the mold carrier. This drive device 112, which may also be controlled by cam rollers here, is arranged outside the sterile chamber 6. Instead of a drive by cam rollers, however, other drives would also be conceivable, such as for example electric drives, linear motors, hydraulic or pneumatic drives and the like. Reference 116 denotes a further drive device (not shown in detail) which brings about a movement of a bottom mold 106. References 266 and 268 denote regions in which rotating parts of a wall of the sterile chamber are sealed off from stationary parts, for example by means of water locks.

The valve block 204, as well as a drive device denoted in its entirety by 210 for moving the blow molding nozzle, is once again arranged here above the clean chamber 6. In FIG. 5, only a cam roller is shown, but not the associated guide cam. The cam roller in turn moves a carriage, which is mounted here in such a way as to be movable in the longitudinal direction (P1).

Reference 270 denotes a further drive device for moving the stretching rod 5. Here too, only the guide roller 271 is shown, which is movable relative to a guide cam (not shown). Reference 211 denotes the corresponding guide roller of the drive device 210. Reference 272 denotes a carriage which serves for moving the stretching rod 5.

Figure 6A:
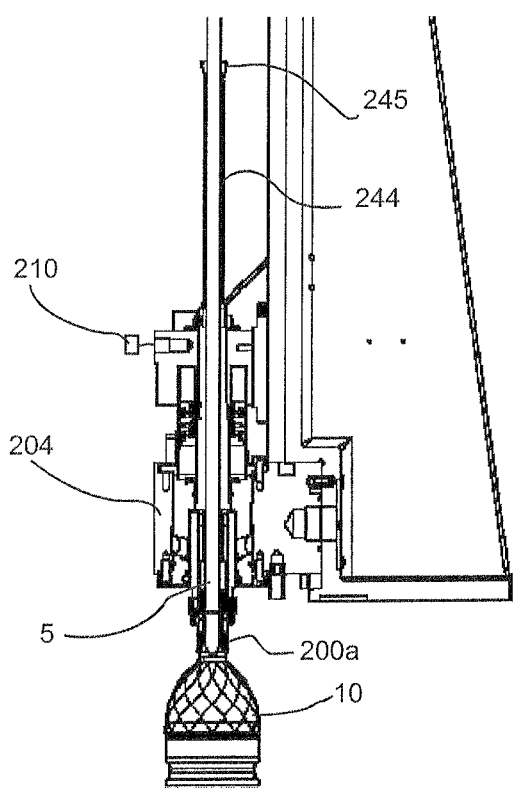
FIGS. 6a-6b show two diagrams to illustrate a bellows surrounding the stretching rod.
Figure 6B:
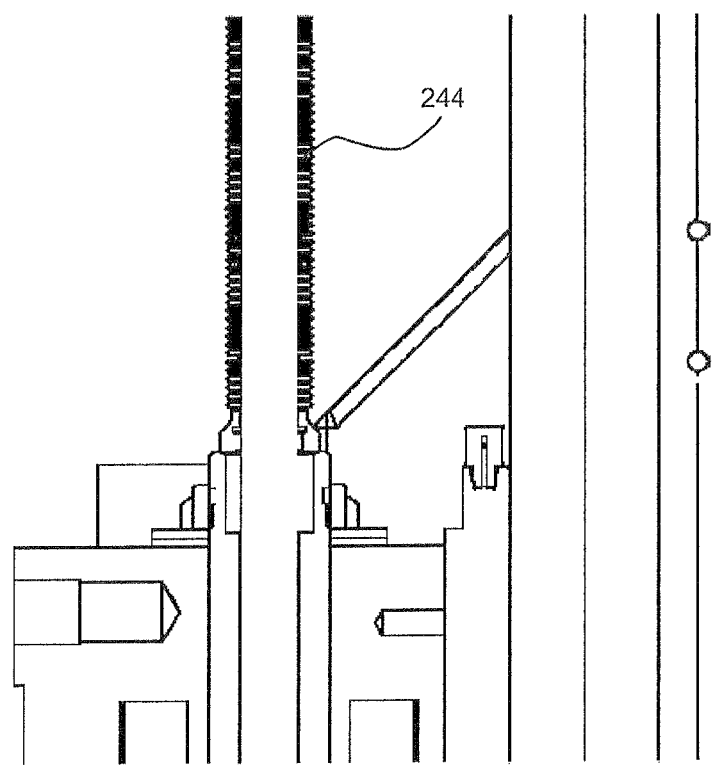

FIGS. 6a and 6b show a further embodiment for hygienic sealing. In this embodiment, the stretching rod 5 is guided at least partially inside a sealing device, such as a bellows 244. More specifically, a bellows 244 is fitted on the stretching rod 5 here. Said bellows replaces the "seal" shown in FIG. 3 and separates the sterile side of the stretching rod, which faces towards the bottle that is to be blow-molded, from the non-sterile side.

In this case, the stretching rod 5 is advantageously designed in such a way that it can be sterilised at predefined time intervals using a suitable agent, such as for example H2O. In this way, it is possible to prevent germs from being able to pass from the external area U into the container by means of the stretching rod. The bellows 244 may also be attached to the stretching rod by an attachment means 245.

Furthermore, in the illustrated embodiment, it would also be possible that the valve block 204 is sterilised by heating. In this case it is possible to heat the components of the valve block to a temperature of up to 100° or up to 130°. The stretching rod 5 may also be heated in order to sterilise it.

FIG. 6b shows a detail diagram of the arrangement shown in FIG. 4a. It can be seen that the bellows 244 can also execute a movement of the stretching rod to the extent necessary for stretching the containers.

FIGS. 7a and 7b show a further embodiment which serves for sterilising the stretching rods. Here, a stretching rod which is rinsed with media or vapour is provided, in which vapour is produced in the space behind the respective seal and thus constantly sterilises the stretching rod 5. When the stretching rod is extended, the sterilised stretching rod thus comes into contact with the container that is to be blow-molded. The part of the stretching rod which penetrates into the rear space is immediately sterilised again by the vapour produced. In this way, it is ensured that no germs are transported into the container 10 by the stretching rod 5. Here too, this vapour barrier 225 is arranged above the valve block 204. On the other hand, the drive device 210 is provided above the vapour barrier so that, here too, the drive device 210 is provided outside the sterile chamber 6.

In the detail diagram of FIG. 7b, it is once again possible to see the chamber 232 into which the barrier medium is introduced. Also shown is the sealing device 234 which seals off this chamber at the bottom. It is also possible to provide inside the chamber 232 a temperature sensor 242 (shown only schematically) which controls the temperature of the barrier medium and in this way ensures efficient sterilisation.

Reference 216 denotes a channel, through which blow molding air for expanding the container is fed.

Figure 8A:
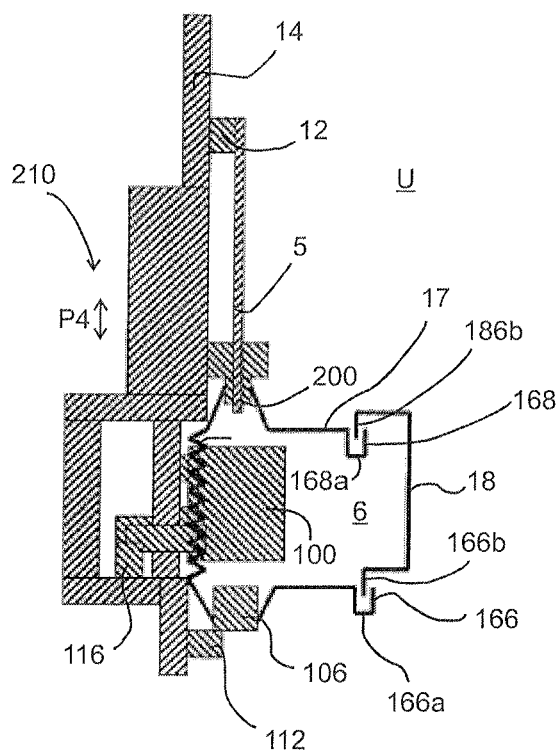
FIGS. 8a-8c show three diagrams to illustrate the clean chamber.
Figure 8B:
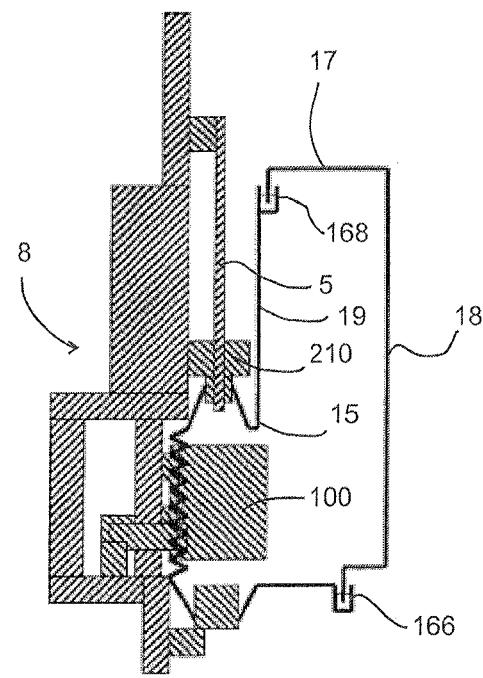
Figure 8C:
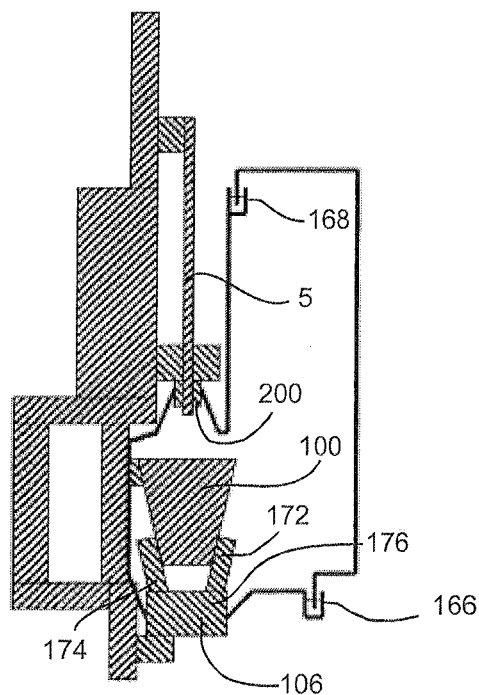

FIGS. 8a to 8c show diagrams to illustrate the specific design of the clean chamber 6 in which the blow mold 100 is arranged. It is once again possible to see here the wall which is arranged in a stationary manner and which separates the clean chamber 6 from the surrounding environment U. References 166 and 168 denote so-called water locks which enable the clean chamber 6 to be sealed off. For this purpose, annular channels 166a and 168a are respectively provided, into which segments 168b and 166b penetrate, said segments likewise being annular here. A liquid medium, such as for example water, is located in the annular channels 166a and 168a. In this embodiment, the channels move. However, it would also be conceivable that the channels are arranged on the wall 18 and thus are arranged in a stationary manner.

Reference 5 denotes the stretching rod, which can likewise be introduced into the clean chamber 6. Reference 200 denotes the blow molding nozzle which, for shaping the plastic preforms, can be placed onto the blow mold or the containers in order in this way to apply compressed air to the plastic preforms arranged therein. The stretching rod 5 is moved by means of a carriage 12 which is arranged in a displaceable manner on a carrier 14. Reference 210 denotes the drive device, which in this case moves the blow molding nozzle 200 in the direction of the double-headed arrow P4. Also shown is the drive device 112 which serves for moving the bottom part 106, and the drive device 116 which serves for moving the two side parts of the blow mold 100.

FIG. 8b shows a further embodiment of a blow molding station 8 according to the invention. It can be seen that here the upper water lock 168 shown in FIG. 8a is offset very far upwards in order to make it easier for the operator to gain access for example when changing the blow mold. Furthermore, it is also conceivable here that the wall 18 or a hood, of which this wall 18 forms part, can be moved upwards as a whole in order in this way to make it possible to change the blow mold. Here, the clean chamber has a kink 15 which is arranged between the cover 17 and the vertical wall 19. The vertical wall 19 is located above the valve device 210 and at most 50 cm, preferably at most 25 cm, away from the stretching rod 5.

FIG. 8c shows a further embodiment of an apparatus according to the invention. In this embodiment, the approaching of the bottom part 106 to the blow mold 100 is combined with a closing of the side parts of the blow mold. A pot-type lock is thus provided here which, as the two side guides 172, 174 are moved upwards, at the same time also closes the side parts of the blow mold. Advantageously, the blow mold 100 here has smooth outer surfaces, along which the side guides 172, 174 can slide more easily. Here too, the upper water lock 168 is shown relative far upwards. However, a combination with the embodiment of the two water locks 166, 168 shown in FIG. 7a would also be conceivable here. Arranged on at least the base part 176 or one of the side parts 102, 104 are plastic sliding bearings which, contrary to rollers, assist in achieving a hygienic design. Rollers would nevertheless also be conceivable. This principle could also be transferred to the blow molding nozzle 200.

FIG. 9 shows an embodiment of an application device 200. Here, this application device comprises a blow molding piston 200b, on which a nozzle 200a is arranged. A spring device 208 is provided which pushes apart the blow molding nozzle 200a and the blow molding piston 200b and thus biases the blow molding nozzle towards a mouth 10a of the plastic preform. Also by means of the spring device 208, therefore, the blow molding nozzle is biased towards the plastic preform for sealing purposes. Reference 214 denotes a sealing device which seals off the blow molding nozzle 200a from the blow molding piston 200b. Via a feed line 210, the blow molding air or process air is fed to the blow molding nozzle and thus also to the plastic preform 10. It can be seen that, in the embodiment shown in FIG. 9, a large number of gaps arise, in particular including between the blow molding piston 200b and the blow molding nozzle 200a, which pose a problem in particular for aseptic applications.

FIG. 10 shows a further embodiment of an apparatus according to the invention. It is once again possible to see here the plastic preform 10, which comprises a mouth 10a, and a blow molding nozzle 200a, which can be placed here with one region against a carrying ring 10b of the plastic preform. In addition, in this embodiment, the blow molding nozzle 200a optionally (or alternatively) also has a section 284 which penetrates into the interior of the plastic preform 10. It can be seen that here the blow molding nozzle 200a has a circumferential and also flexible connection 286. In this case, therefore, the blow molding nozzle 200a is partially connected in a stationary manner to the blow molding piston 200b, wherein an elastic connection 286 exists between a part 288 of the blow molding nozzle 200a bearing in a stationary manner against the blow molding piston and the parts 282, 284 that can be placed against the plastic preform 10. Here, this elastic connection is made from metal, such as for example spring steel.

By virtue of this connection 286, a peripheral surface A1 is also formed here, to which process air is also applied (arrow P1) via the feed line 210 during the expansion of the plastic preforms 10. Reference 203 denotes a feed line for the process air. Also shown in FIG. 10 is the stretching rod 5, which can likewise be introduced into the plastic preform 10 in order to stretch the latter.

During the expansion process, the blow molding air also acts (cf. arrow P1) on the transition regions 286 and thus the blow molding air also brings about a further biasing of the blow molding nozzle 200a towards the plastic preform 10 and hence an improved sealing effect.

FIG. 11 shows a further embodiment of a blow molding nozzle 200a according to the invention. In this embodiment, the blow molding nozzle 200a likewise has a connection device 287. The blow molding air is also applied to this elastic connection 286, as illustrated by the arrow P1, and thus causes the blow molding nozzle 200a to be biased towards the plastic preform 10 by the blowing pressure. Here, the connection region 287 is formed from an elastic material, such as in particular an elastomer.

Figure 12:
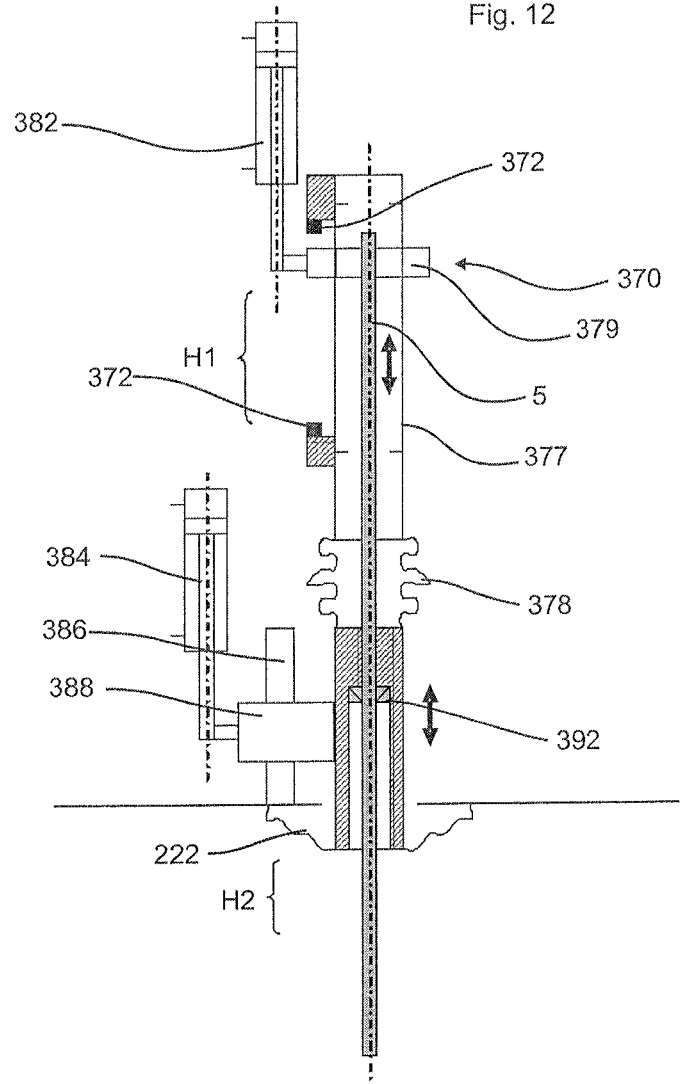
FIG. 12 shows a further embodiment to illustrate a stretching rod guide.

FIG. 12 shows an embodiment to illustrate a stretching rod movement. In this embodiment, a stretching rod 5 is arranged inside a closed housing 377 and is thus also sealed off from the environment surrounding the clean chamber 6. Also provided is a coupling device which is denoted in its entirety by 370 and which is arranged partially inside the housing 377 on the stretching rod 5 and has a further coupling element 379 outside this housing 377. Reference 382 denotes a drive device, such as for example a pneumatic drive, which serves for moving the coupling element 379.

Reference 372 denotes end stops which limit the travel of the coupling element 379 and thus also the travel of the stretching rod. These end stops 372 may in this case be made from an elastic material in order to damp the movement accordingly.

Reference H1 denotes the travel of the stretching rod 5.

Reference 384 denotes a further drive device which serves for moving the application device 200. Reference H2 accordingly denotes the travel of this application device. A coupling element 388 is also provided here, but in this case it is arranged directly on the application device 200, i.e. optionally also without a magnetic coupling. Reference 386 denotes a guide device which serves for guiding the coupling element 388. Reference 378 denotes a sealing device such as a bellows, which absorbs the relative movement between the application device 200 and the housing 377 so that the stretching rod 5 can be arranged completely inside a sterile chamber. Reference 392 denotes a sealing device which absorbs the movement of the stretching rod relative to the application device 200 and preferably also seals it off. In addition, there is also provided again here the sealing device 222 in the form of a bellows which also absorbs the movement of the application device 200 in the direction of the arrow H2. It can be seen that the travel of the application device 200 is smaller than the travel H1 of the stretching rod 5. Reference 6 once again denotes the clean chamber.

Figure 13:
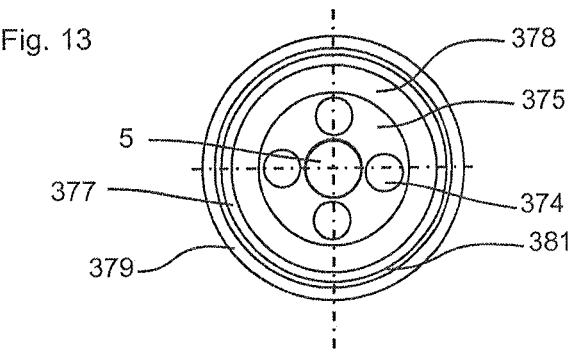
FIG. 13 shows the diagram of a coupling for the stretching rod guide.

FIG. 13 shows a sectional view of the coupling device 370. It is firstly possible to see here the stretching rod 5, on which a piston element 375 is arranged. Provided on this piston element are a plurality of openings 374, through which air can pass as the piston element 375 moves relative to the housing 377. A magnetic element 378 is arranged on this piston.

Reference 377 denotes the housing or the housing wall, inside which the stretching rod is arranged. Reference 379 denotes the coupling element interacting with the magnetic element 378. Said coupling element may likewise be a magnet, wherein this outer magnet 379 can be oppositely polarised relative to the inner magnet 378 so that the appropriate attraction effect is achieved. As can be seen in FIG. 13, the coupling element 379 extends in the circumferential direction completely around the stretching rod and/or around the housing 377. A circumferential gap 381 is preferably formed between the coupling element 379 and the housing 377, by means of which the upward and downward movement is facilitated.

Figure 14:
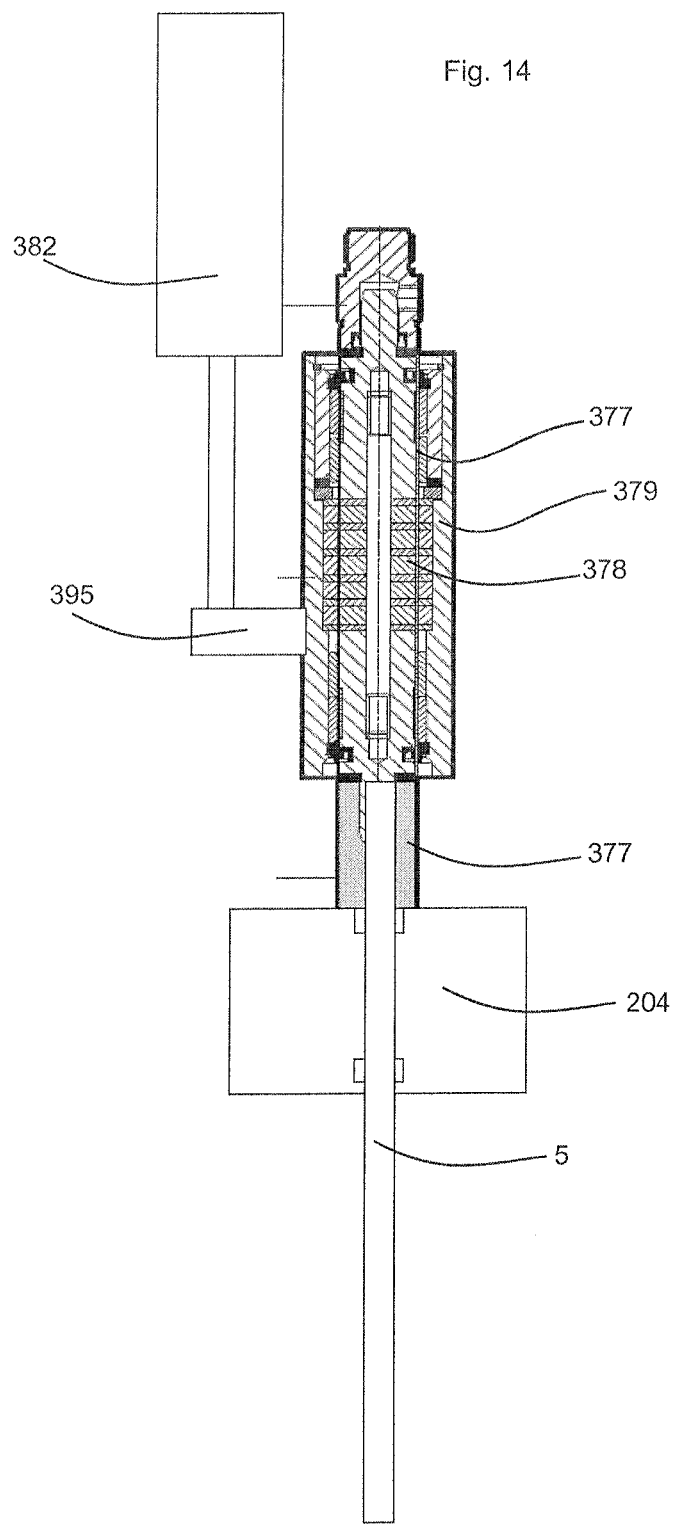
FIG. 14 shows a further diagram of a stretching rod guide.

FIG. 14 shows a further diagram of the movement device explained above. Shown once again here is the drive device 382 and also the carrier 390 arranged thereon via an attachment element 395. The circumferential magnetic element 379 is arranged in this carrier and is thus moved upwards and downwards with the carrier 390. The inner magnetic element 378 can likewise be seen once again in FIG. 14. Here, reference 204 once again denotes the valve block, inside which the stretching rod 5 is guided.

Figure 15:
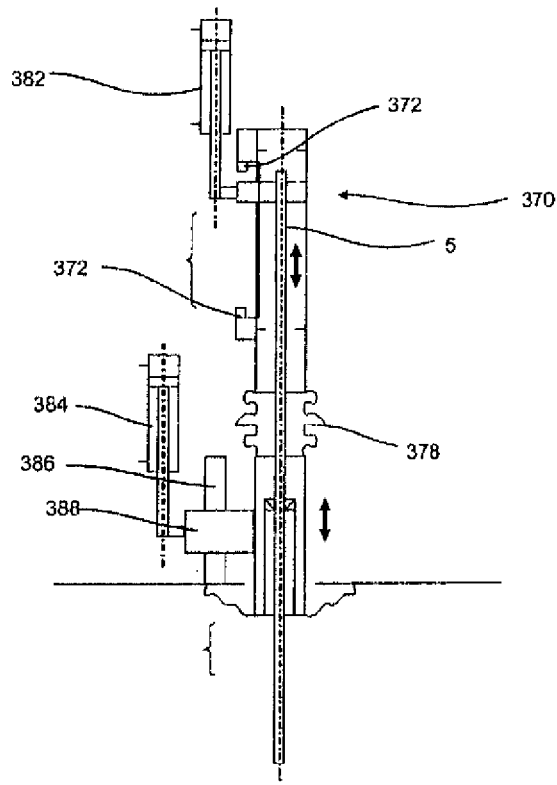
FIG. 15 shows a further diagram to illustrate the stretching rod movement.

FIG. 15 shows a further embodiment of a stretching rod movement device according to the invention. Provided again here is the stretching rod 5, which is arranged on a coupling element 370. In the embodiment shown in FIG. 15, however, the stretching rod is not magnetically coupled to the drive 382 but rather is mechanically coupled directly thereto. However, in the embodiment shown in FIG. 15, a sealing device 310 such as a sealing strip is provided, which covers an opening 304 (cf. FIG. 16) arranged inside the housing 377. In this way, a sealing of the stretching rod chamber is also achieved in this embodiment.

Figure 16:
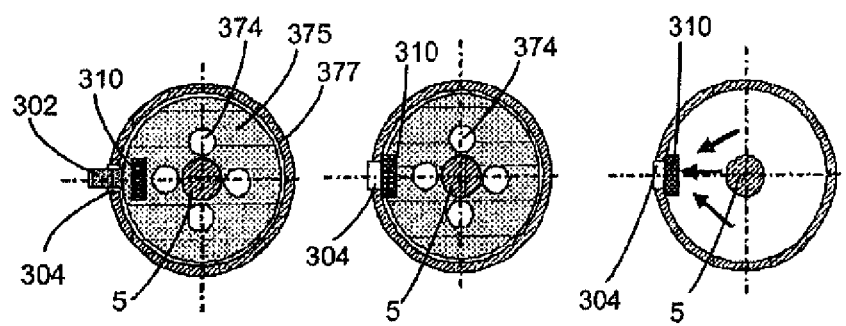
FIG. 16 shows three diagrams of a coupling device for moving a stretching rod.

FIG. 16 shows three diagrams to illustrate this situation. In the left-hand picture of FIG. 16, this sealing strip 310 is incorporated in the movement body 375 or the piston element and the coupling element 302 is likewise directly attached to the piston element 375. In this way, the sealing strip reliably moves with the piston element 375 and also covers the opening 304 outside the piston, said opening being configured here as an elongate opening. In the diagram shown in the middle picture of FIG. 16, the sealing device 310 is arranged on the outer circumference or on a region of the outer circumference of the piston body 375 and likewise seals off the opening 304. The middle picture thus shows a section through the same element as in the left-hand picture, but simply offset slightly downwards or upwards, as a result of which it is possible to see that here the sealing device 310 closes the opening 304. The right-hand picture shows a section outside the region of the piston element 375. In this region it can be seen that, due to the increased air pressure inside the housing 377, the sealing strip 310 is pressed against the opening 304 and closes the latter.

The applicant reserves the right to claim all the features disclosed in the application documents as essential to the invention in so far as they are novel individually or in combination with respect to the prior art.

LIST OF REFERENCES

1 shaping apparatus
2 transport wheel
5 stretching rod
6 clean chamber
8 blow molding station
10 plastic preforms, container
10*a* mouth
10*b* carrying ring of the plastic preform
11 follower device
12 carriage
13 bottom
14 mount
15 kink
16 side wall
17 cover
18 wall
19 vertical wall
20 plastic container
22 feed device
23 holding device
24 discharge device
25 sealing device
26 carrier
27 sealing device
29 holding body
30 heating device
31 heating elements
32 sterilising device
34 transport device
36 transfer unit
37 transport wheel
40 filling device
42 transfer unit
44 transport unit
50 installation
100 blow mold carrier 106 bottom part
112, 116, 210, 216 drive device
166, 168 water locks
166a, 168a annular channels
166b, 168b annular segments
172, 174 side guides
200 application device, blow molding nozzl
200a blow molding nozzle
200b blow molding piston
200c underside of the application device
202 chamber
203 feed line
204 valve block
206 feed
208 spring device
210 feed line
211, 271 guide roller
212, 272 carriage
214 sealing device
216 channel
218, 220,
226, 234, 240 sealing device
222 bellows
224 carrier
225 gas barrier, vapour barrier
228 second sealing device
232 receiving chamber
236 connecting line
238 second sealing chamber
242 temperature sensor
244 bellows
245 attachment means
260 sealing device (prior art)
266, 268 water locks
270 drive device for moving the stretching rod
282 parts which can be placed against the carrying ring
284 parts engaging in the preform
286, 287 connection
288 parts bearing against the blow molding piston
304 opening
310 sealing device, sealing strip
370 coupling device
372 end stops
374 openings
375 piston element
377 housing
378 magnetic element
379 coupling element
381 circumferential gap
384 drive device
386 guide device
388 coupling element
390 carrier
392 sealing device
359 attachment element
L line
P1 direction
P4 arrow
P5 arrow
S sterile chamber boundary
U surrounding environment
X axis
Y direction
H1 travel of the stretching rod
H2 travel of the application device
A1 surface

The invention claimed is:

1. An apparatus for shaping plastic preforms into plastic containers, comprising a transport device on which a plurality of blow molding stations are arranged, wherein each of these blow molding stations comprises a blow mold, and the apparatus comprises a clean chamber inside which the plastic preforms can be transported, and wherein each blow molding station comprises an application device which is movable relative to the blow mold and which applies a gaseous medium to the plastic preforms inside the clean chamber, and a drive device is provided for moving the application device, characterised in that the drive device is arranged in an area (U) outside the clean chamber and a sealing device is provided which seals off the clean chamber from an area in which the drive device is arranged.

2. The apparatus according to claim 1, wherein the sealing device comprises an elastic seal or a gas barrier.

3. The apparatus according to claim 1, wherein a stretching rod for stretching the plastic preforms is arranged on each blow molding station.

4. The apparatus according to claim 3, wherein the stretching rod is arranged at least partially inside the clean chamber and is sealed off from the area (U) outside the clean chamber by the seals.

5. The apparatus according to claim 3, wherein the apparatus comprises a drive device arranged outside the clean chamber for moving the stretching rod and this drive device is coupled to the stretching rod via a first magnetic coupling device.

6. The apparatus according to claim 1, wherein the application device is pushed in the direction of the plastic preforms at least at times by the gaseous medium for application to the plastic preforms.

7. The apparatus according to claim 3, wherein the entire stretching rod is arranged inside a sealing device.

8. The apparatus according to claim 1, wherein the blow mold comprises at least two side parts and one bottom part and wherein the side parts and the bottom part are moved via at least one drive device.

9. The apparatus according to claim 8, wherein the at least one drive device for moving the side parts and/or the bottom part is arranged at least partially outside the clean chamber, and a sealing device is provided which seals off the clean chamber from all area in which the at least one drive device is arranged.

10. The apparatus according to claim 8, wherein a coupling device is provided which couples the movement of the bottom part to the movement of the side parts.

11. The apparatus according to claim 10, wherein the coupling device is arranged at least partially inside the clean chamber or is provided entirely outside or entirely inside the clean chamber.

12. The apparatus according to claim 8, wherein one drive device is provided for moving the bottom part and a further drive device is provided for moving the side parts.

13. The apparatus according to claim 9, wherein at least one drive device is arranged outside the clean chamber and is coupled to at least one side part or to the bottom part via a coupling device.

14. The apparatus according to claim 13, wherein the coupling device extends through a boundary of the clean chamber.

15. The apparatus according to claim 14, wherein the sealing device is an elastic sealing device and the coupling device is a rod assembly, and wherein the sealing device is arranged on the rod assembly and follows the coupling device in terms of its movement.

16. The apparatus according to claim 1, wherein the apparatus comprises feed devices for feeding a temperature control fluid for the blow molds and wherein a clean chamber boundary is provided in such a way that the feed devices and connections for the feed devices are all arranged in the bottom part, outside the clean chamber.

17. The apparatus according to claim 16, wherein the clean chamber is delimited in a downward direction by a solid boundary with an opening, and wherein the opening serves at least for a passage of the bottom part and for a passage of the feed devices.

18. The apparatus according to claim 1, wherein a wall which forms a boundary of the clean chamber is arranged to move with the individual blow molding stations.

19. The apparatus according to claim 1, wherein the transport device is a transport wheel which rotates about a predefined axis, and wherein at least the axis or a shaft of the transport device is arranged outside the clean chamber.

20. The apparatus according to claim 3, wherein the stretching rod is arranged in a housing or tube and completely sealed off from the environment surrounding the clean chamber, and wherein the housing or tube is connected to the clean chamber.

21. The apparatus according to claim 1, wherein a process air for expanding the plastic preforms is also used to press the blow molding nozzle of the application device against the plastic preform for sealing purposes.

22. The apparatus according to claim 1, wherein the clean chamber is delimited by a plurality of walls, and at least one of these walls is arranged such as to be able to move and in particular rotate relative to another wall.

* * * * *

UNITED STATES PATENT AND TRADEMARK OFFICE
CERTIFICATE OF CORRECTION

| | | |
|---|---|---|
| PATENT NO. | : 8,708,680 B2 | |
| APPLICATION NO. | : 13/112913 | |
| DATED | : April 29, 2014 | |
| INVENTOR(S) | : Geltinger et al. | |

It is certified that error appears in the above-identified patent and that said Letters Patent is hereby corrected as shown below:

In the Drawings

Delete Drawing Sheet 10 of 10 and substitute therefore the attached Drawing Sheet 10 of 10. The label "FIG. 15" has been added to top figure.

Signed and Sealed this
Eleventh Day of November, 2014

Michelle K. Lee
*Deputy Director of the United States Patent and Trademark Office*